(12) United States Patent
Knoer et al.

(10) Patent No.: US 11,028,228 B2
(45) Date of Patent: Jun. 8, 2021

(54) PROCESS FOR PRODUCING SPERHICAL POLYSILSESQUIOXANE PARTICLES

(71) Applicant: WACKER CHEMIE AG, Munich (DE)

(72) Inventors: Sebastian Knoer, Emmerting (DE); Kathrin Seilinger, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 22 days.

(21) Appl. No.: 16/484,331

(22) PCT Filed: Feb. 14, 2017

(86) PCT No.: PCT/EP2017/053253
§ 371 (c)(1),
(2) Date: Aug. 7, 2019

(87) PCT Pub. No.: WO2018/149475
PCT Pub. Date: Aug. 23, 2018

(65) Prior Publication Data
US 2020/0031998 A1    Jan. 30, 2020

(51) Int. Cl.
*C08G 77/08* (2006.01)
*C08G 77/04* (2006.01)
*C08J 3/14* (2006.01)

(52) U.S. Cl.
CPC ........... *C08G 77/08* (2013.01); *C08G 77/045* (2013.01); *C08J 3/14* (2013.01)

(58) Field of Classification Search
CPC .......... C08G 77/045; C08G 77/08; C08J 3/12; C08J 3/14
See application file for complete search history.

(56) References Cited

U.S. PATENT DOCUMENTS 10,662,292 B2 * 5/2020 Knoer .................... A61K 8/025
2010/0256321 A1 * 10/2010 Kim .......................... C08J 3/12
528/14
2016/0368776 A1    12/2016 Kizaki et al.

FOREIGN PATENT DOCUMENTS

| EP | 3106433 A1 | 12/2016 |
| JP | 1045914 A | 2/1989 |
| JP | 4088023 A | 3/1992 |
| JP | 6248081 A2 | 9/1994 |
| JP | 2000186148 A | 7/2000 |
| JP | 2003-335860 A * | 11/2003 |
| JP | 2003342370 A | 12/2003 |
| JP | 2009068019 A | 4/2009 |
| JP | 2017007877 A | 1/2017 |
| KR | 930006260 B1 * | 7/1993 |

* cited by examiner

*Primary Examiner* — Marc S Zimmer
(74) *Attorney, Agent, or Firm* — Brooks Kushman P.C.

(57) ABSTRACT

Spherical organopolysiloxane resin particles with improved flow properties can be reproducibly obtained employing trialkoxysilanes having different hydrolysable chlorine contents by regulating pH in a first, acid hydrolysis step, and then adjusting pH in a second step to a desired value between 1 and 6. Particles are allowed to grow without agitation in a subsequent basic condensation step.

15 Claims, No Drawings

PROCESS FOR PRODUCING SPERHICAL POLYSILSESQUIOXANE PARTICLES

CROSS REFERENCE TO RELATED APPLICATIONS

This application is the U.S. National Phase of PCT Appln. No. PCT/EP2017/053253 filed Feb. 14, 2017, the disclosure of which is incorporated in its entirety by reference herein.

BACKGROUND OF THE INVENTION

Field of the Invention

The invention relates to a process for producing spherical polysilsesquioxane particles by hydrolysis of trialkoxysilane and condensation of the hydrolyzate at controlled pH.

The prior art, for example JP3970449B2, JPH06248081A and JPH0488023A, includes various processes for producing spherical polymethylsilsesquioxane particles. JP3970449B2 describes optimization of the space-time yield and control of particle size. Drying results in a melting of the particles and the establishment of a network structure. Control of particle size in particular requires control of pH since the size growth of the particles is pH-dependent.

Processes for producing polymethylsilsesquioxane particles known from JP3970449B2 and JPH06248081A make it possible to control the median particle size by using methyltrialkoxysilane having a very low chlorine content as raw material. Uncontrolled alteration of the pH by the raw material via its purity is thus avoided. The use of very pure raw material, thus making the process very costly, is a disadvantage. As a consequence of production, trialkoxysilanes contain chlorine in the form of free HCl, bonded to silicon as chlorosilanes, and bonded to carbon as chlorohydrocarbons. These chemical compounds completely or partially react in water to form HCl.

Depending on the chemical composition of the impurities, different batches of the same raw material may, at a formally identical content by weight, form different amounts of HCl upon contact with water and thus exhibit different levels of acidity. This affects product quality.

SUMMARY OF THE INVENTION

The present invention provides a process for producing spherical polysilsesquioxane particles wherein in a first step trialkoxysilane T which contains trialkoxysilanes of general formula (I)

$$RSi(OR^1)_3 \qquad (I),$$

in which
R represents a hydrocarbon radical having 1 to 16 carbon atoms whose carbon chain may be interrupted by nonadjacent groups —O—,
$R^1$ represents a $C_1$- to $C_4$-alkyl radical,
and contains chlorine compounds,
is reacted by mixing with acidified water having a pH of at most 6 to afford a hydrolyzate,
in a second step the pH of the hydrolyzate is adjusted to a value of 1 to 6,
in a third step the hydrolyzate is mixed with a solution of a base in water or $C_1$- to $C_4$-alkanol,
and in a fourth step the mixture is stored for at least 2 h before the polysilsesquioxane particles are isolated.

DETAILED DESCRIPTION OF THE PREFERRED EMBODIMENTS

The invention provides a process which makes it possible, starting from the industrial, inexpensive raw material trialkoxysilane T, to perform a precipitation at controlled pH and thus produce a defined and reproducible particle size despite varying raw material quality.

When using industrial trialkoxysilane T which has a markedly different content of chlorine between different raw material batches, a very different acidic pH is established during the hydrolysis in each case. This results in a different rate of the progress of network establishment by formation of bridging and branching units during the acidic phase of the reaction. Thus depending on the chlorine content of the trialkoxysilane T the first reaction phase forms macromolecules of different sizes which act as precipitation seeds upon addition of the base in the third step. It has now been found, entirely unexpectedly, that, independently of the chlorine content of the trialkoxysilane T, identically sized polysilsesquioxane particles are always obtained when in the second step the pH of the hydrolyzate is adjusted to a value of 1 to 6

The process according to the invention therefore introduces the second process step in which after termination of the addition of trialkoxysilane T the pH of the reaction mixture is adjusted still in an acidic environment. At this juncture the reaction batch is stable over several hours. Starting from a stable acidic pH a controlled precipitation at defined pH can be initiated by addition of a defined amount of base in the third step.

Trialkoxysilane T in particular contains, as a consequence of production, chlorine in the form of free HCl, as Si—Cl in chlorosilanes and as C—Cl in chlorohydrocarbons. Typically the content of free HCl is at most 100 ppmw, more preferably at most 50 ppmw, and in particular at most 30 ppmw.

Typically, the content of chlorosilanes is at most 3% by weight, more preferably at most 2% by weight, and in particular at most 10% by weight.

Preferably the content of chlorohydrocarbons is at most 3% by weight, more preferably at most 2% by weight, and in particular at most 1% by weight.

Typically the total content of chlorine in the trialkoxysilane T is at most 4000 ppmw, preferably at most 3000 ppmw, more preferably at most 2000 ppmw, and most preferably at most 1000 ppmw.

R preferably represents an alkyl radical having 1 to 6 carbon atoms or phenyl radical, in particular the ethyl radical or the methyl radical.

$R^1$ preferably represents a methyl, ethyl or n-propyl radical, in particular a methyl radical.

Preferred trialkoxysilanes of general formula (I) are methyltrimethoxysilane, methyltriethoxysilane, methyltri-n-propoxysilane, methyltriisopropoxysilane and methyltris(2-methoxyethoxy)silane and mixtures thereof.

The reaction to afford a hydrolyzate is preferably carried out in acidified water having a pH of at most 5.5, more preferably at most 4.5 and preferably at least 1, more preferably at least 2, and in particular at least 2.3.

The water employed is preferably demineralized and prior to acidification preferably has a conductivity of at most 50 µS/cm, more preferably at most 30 µS/cm, yet more preferably at most 20 µS/cm, and most preferably at most 10 µS/cm, in each case measured at 20° C.

Acidification of the water may be carried out using Brønsted acids or Lewis acids.

Examples of Lewis acids are $BF_3$, $AlCl_3$, $TiCl_3$, $SnCl_4$, $SO_3$, $PCl_5$, $POCl_3$, $FeCl_3$ and hydrates thereof, and $ZnCl_2$.

Examples of Brønsted acids are hydrochloric acid, hydrobromic acid, sulfuric acid, nitric acid, nitrous acid, chlorosulfonic acid, phosphoric acids such as ortho-, meta- and polyphosphoric acids, boric acid, selenic acid, nitric acid, carboxylic acids, such as formic acid, acetic acid, propionic acid, citric acid and oxalic acid, haloacetic acids such as trichloroacetic and trifluoroacetic acid, p-toluenesulfonic acid, acidic ion exchangers, acidic zeolites and acid-activated Fullers earth.

Hydrochloric acid, hydrobromic acid and acetic acid are preferred.

The acidification of the water may be carried out before the reaction to afford the hydrolyzate, at the same time as the reaction either before the reaction or at the same time as the reaction. In a particular embodiment the water is partially acidified with hydrochloric acid before the reaction to afford the hydrolyzate and a further portion of hydrochloric acid is introduced via the trialkoxysilane T.

The hydrolysis of the trialkoxysilane of general formula (I) is a weakly exothermic reaction. In a preferred embodiment, by optionally heating or cooling, the temperature in the first step is kept by preference at 0° C. to 60° C., more preferably at 10° C. to 50° C., yet more preferably at 15° C. to 40° C., still more preferably at 15° C. to 30° C., and in particular at 15-25° C., wherein after reaching the target temperature the temperature variation is by preference less than 10° C., more preferably less than 5° C. The metered addition of the trialkoxysilane T may be commenced before or after reaching the target temperature, as desired.

In another embodiment the trialkoxysilane T is metered in one portion. The heat is not removed or only partially removed by cooling. In this embodiment an exothermic increase in the temperature takes place after addition of the trialkoxysilane T. The temperature of the reaction in the first step is 20° C. to 80° C., preferably up to 60° C.

The trialkoxysilane T is preferably metered in over 0.5 to 5 h, more preferably at most 2 h. There is a continuum of inventive embodiments between rapid addition and metered addition, i.e. addition may be swift over 15 min for example with partial heat removal up to at most 40° C. or addition may comprise metering over 2 h for example with only little cooling, thus initially permitting a temperature increase to 30° C. and maintaining this temperature.

Metered addition at a constant temperature is particularly preferred.

It is preferable when in the first step, per 100 parts by weight of water, 5 to 43 parts by weight, preferably 11 to 34 parts by weight, and in particular 13 to 25 parts by weight of trialkoxysilane T are employed.

The commixing in the first step may be carried out by means of a static mixer or preferably by means of a stirrer.

After metered addition of the trialkoxysilane T the mixture is preferably stirred for a further 5 min to 5 h, more preferably 10 min to 3 h, and in particular 15 min to 1.5 h. The further stirring time is preferably chosen such that the sum of the addition time of the silane and the further stirring time does not exceed 6 h.

The temperature during the further stirring is maintained at 0° C. to 60° C., preferably at 10° C. to 50° C., more preferably at 10° C. to 40° C., yet more preferably at 10° C. to 30° C., and in particular at 15° C. to 25° C. It is preferable when the difference in the temperature of the reaction in the first step and the temperature during the further stirring is less than 20° C., preferably less than 10° C., and in particular less than 5° C.

In the second step, the pH of the hydrolyzate is adjusted to a value of 1 to 6 before the hydrolyzate is precipitated in the third step with a defined amount of base. The target pH in the acidic range is in principle freely definable. It is preferable when the target pH is at least 2, in particular at least 2.3, and preferably at most 5.5, more preferably at most 4.5.

The more precisely the target pH is adjusted the narrower the distribution of median particle size between different reaction batches. It is preferable when the deviation in the pH is less than ±1, preferably less than ±0.5, more preferably less than ±0.3, and in particular less than ±0.1.

Kinetics studies using NMR have shown that the rate of hydrolysis of the trialkoxysilanes of general formula (I) in an acidic environment is pH-dependent and proceeds faster the lower the pH. The rate of the condensation reaction is likewise pH-dependent and increases at low pH.

It is preferable, when in the second step for adjusting the pH of the hydrolysate, an acid which may also be employed in the first step is used or a base which may also be employed in the third step is used.

Acidification may be carried out using Brønsted acids or Lewis acids.

Examples of Lewis acids are $BF_3$, $AlCl_3$, $TiCl_3$, $SnCl_4$, $SO_3$, $PCl_3$, $POCl_3$, $FeCl_3$ and hydrates thereof and $ZnCl_2$. Examples of Brønsted acids are hydrochloric acid, hydrobromic acid, sulfuric acid, nitric acid, nitrous acid, chlorosulfonic acid, phosphoric acids, such as ortho-, meta- and polyphosphoric acids, boric acid, selenic acid, nitric acid, carboxylic acids such as formic acid, acetic acid, propionic acid, citric acid and oxalic acid, haloacetic acids such as trichloroacetic and trifluoroacetic acid, p-toluenesulfonic acid, acidic ion exchangers, acidic zeolites and acid-activated Fullers earth.

Hydrochloric acid, hydrobromic acid and acetic acid are preferred.

It is preferable, in the second step, that the base is selected from alkali metal hydroxide, alkaline earth metal hydroxide, alkali metal methoxide, ammonia and organic amines. Preferred organic amines are alkylamines, such as mono-, di-, or triethylamine, mono-, di-, or trimethylamine, or 1,2-ethylenediamine. It is preferable to employ the hydroxides of Li, Na, and/or K. It is preferable to employ a solution of alkali metal hydroxide in water or in an alkanol having 1 to 3 carbon atoms. Preferred alkanols are 1-propanol, 2-propanol, ethanol and in particular methanol. A solution of ammonia or alkali metal hydroxide in water is likewise preferred. Dilute or concentrated solutions of alkali metal hydroxide of 0.001 to 1100 g/l at 20° C., preferably 0.01 to 500 g/l, more preferably 0.1 to 500 g/l, are suitable.

It is preferable to employ, in the second step, a solution of alkali metal hydroxide in water or in an alkanol having 1 to 3 carbon atoms. Preferred alkanols are 1-propanol, 2-propanol, ethanol, and in particular methanol. A solution of alkali metal hydroxide in water is likewise preferred. Dilute or concentrated solutions of alkali metal hydroxide of 0.001 to 1100 g/l at 20° C., preferably 0.01 to 500 g/l, more preferably 0.1 to 500 g/l, are suitable.

It is preferable that adjustment of the pH of the hydrolyzate in the second step is carried out at the temperature of the hydrolyzate after the first step.

The adjustment of the pH of the hydrolyzate in the second step is preferably carried out with commixing. The commixing may be effected by means of a static mixer or preferably by means of a stirrer.

It is preferable when in the third step the base is selected from alkali metal hydroxide, alkaline earth metal hydroxide, alkali metal methoxide, ammonia and organic amines. Preferred organic amines are alkylamines, such as mono-, di-, or triethylamine, mono-, di-, or trimethylamine, or 1,2-ethylenediamine. It is preferable to employ the hydroxides of Li, Na, and/or K. It is preferable to employ a solution of alkali metal hydroxide in water or in an alkanol having 1 to 3 carbon atoms. Preferred alkanols are 1-propanol, 2-propanol, ethanol and in particular methanol. A solution of ammonia or alkali metal hydroxide in water is likewise preferred. Dilute or concentrated solutions of alkali metal hydroxide of 0.001 to 1100 g/l at 20° C., preferably 0.01 to 500 g/l, more preferably 0.1 to 500 g/l, are suitable.

It is preferable when in the third step, a solution of alkali metal hydroxide in water or in an alkanol having 1 to 3 carbon atoms is employed. Preferred alkanols are 1-propanol, 2-propanol, ethanol and in particular methanol. A solution of alkali metal hydroxide in water is likewise preferred. Dilute or concentrated solutions of alkali metal hydroxide of 0.001 to 1100 g/l at 20° C., preferably 0.01 to 500 g/l, more preferably 0.1 to 500 g/l, are suitable.

It was found that in the third step, through the use of a solution of an alkali metal hydroxide selected from NaOH and KOH in combination with the above-described process parameters, very largely agglomerization-free spherical polysilsesquioxane particles may be obtained. Grinding of the particles is not necessary. Such particles exhibit highly advantageous behavior, in particular for cosmetic applications. They are converted into a liquid-like flowable state (fluidization) even at low shear and are therefore exceptionally easy to spread and provide a velvety skin feel. This behavior is not observable for agglomerated particles. These undergo balling upon spreading on the skin.

Fluid, i.e. liquid-like behavior, is apparent in particular immediately after shaking of the polysilsesquioxane particles. The greater the volume increase, the more pronounced the fluid behavior. A material which exhibits a 50% volume increase already shows fluid behavior which for example manifests in that the material in the container—immediately after shaking—flows to and fro similarly to a liquid upon tilting of the container. A material with a 50% volume increase undergoes very rapid sedimentation and returns into the non-fluid initial stage which is disadvantageous. The spherical polysilsesquioxane particles preferably show at least a 100% volume increase.

The dried unground polysilsesquioxane particles preferably comprise at least 30% by weight, more preferably at least 40% by weight, and most preferably at least 50% by weight, of a sieve fraction<20 μm.

The dried unground polysilsesquioxane particles preferably comprise at least 60% by weight, more preferably at least 70% by weight, of a sieve fraction<40 μm.

The dried unground polysilsesquioxane particles preferably comprise less than 25% by weight, more preferably less than 20% by weight, most preferably less than 15% by weight, of a sieve fraction>100 μm.

When using a solution of alkali metal hydroxide in an alkanol having 1 to 3 carbon atoms the particles adhere to one another to a particularly small extent, show a particularly low degree of agglomeration and have less of a propensity for clumping. The particles show a preferred drier skin feel in cosmetic applications.

KOH is preferred as the alkali metal hydroxide.

Also possible as an alternative to NaOH and KOH is the use of an NaOH- or KOH-former which in the second step immediately reacts with the water present in the hydrolyzate to afford NaOH or KOH. Examples thereof are sodium ethoxide, potassium methoxide, NaH and KH. In this embodiment the use of sodium ethoxide or potassium methoxide in methanolic solution is preferred.

It is preferable when sufficient solution of base is added to ensure that a pH of at least 6, preferably at least 6.5 and not more than 10, preferably not more than 9.5 is achieved in each case immediately after addition of the base. The particle size may be influenced by the addition of the amount of base, wherein low pH values result in larger particles. The especially preferred pH is 7.5 to 9.

The solution of base is preferably added over 10 seconds to 10 minutes, in particular over 1 to 3 minutes, preferably with vigorous and short stirring.

In a preferred embodiment the temperature of the addition of base in the third step is by preference maintained at 0° C. to 60° C., more preferably at 10° C. to 50° C., yet more preferably 10° C. to 40° C., and most preferably at 10° C. to 30° C., in particular at 15° C. to 25° C. It is preferable when the difference in the temperature during further stirring and the temperature during addition of base is less than 20° C., more preferably less than 10° C., and in particular less than 5° C.

The commixing in the third step may be effected by means of a static mixer or preferably by means of a stirrer.

After the third step the commixing is preferably terminated within 10 minutes, preferably within 5 minutes. After the second step the mixture is not agitated, by preference, for at least 1 h, more preferably at least 1.5 h, and most preferably at least 2.5 h. A stirrer may subsequently be switched on at low speed to prevent sedimentation of the particles. This is optional and not necessary since the sedimented polysilsesquioxane particles may be readily stirred up.

After the third step the temperature of the mixture is preferably altered by no more than 20° C., preferably no more than 10° C., for by preference at least 1 h, more preferably at least 1.5 h, and most preferably at least 2.5 h.

If in the initial phase of the fourth step in which the formation of the particles takes place the mixture is agitated, this results in an increased incidence of malformed, coalesced or agglomerated particles.

In a preferred embodiment in the fourth step the mixture is not agitated until isolation of the polysilsesquioxane particles.

It is preferable when in the fourth step the mixture is stored for at least 4 h, more preferably at least 7 h, and in particular at least 10 h, before the polysilsesquioxane particles are isolated. Storage times of up to 12 weeks are also possible.

Clouding is usually visible even after 1-30 minutes.

The temperature in the fourth step is by preference 0° C. to 60° C., more preferably 10° C. to 50° C., yet more preferably 10° C. to 40° C., still more preferably 10° C. to 30° C., and in particular 15° C. to 25° C. At low temperatures larger particles are formed and at higher temperatures smaller particles are formed.

At a temperature of 15° C. to 25° C. there is little if any temperature gradient in the reaction mixture toward the outer region, thus a minimal thermal gradient between the reactor wall and the reaction solution and thus minimized thermal convection during the precipitation of the particles.

The process according to the invention may be run as a batch, semi-batch or continuous process.

In a preferred embodiment the mixture is neutralized by addition of an acid after the fourth step. After the fourth step the particles are preferably isolated, preferably by filtration or centrifugation. After isolation the particles are preferably washed with DM water or alcohol and preferably dried.

Drying is preferably effected at 40° C. to 250° C., more preferably at 100° C. to 240° C., and most preferably at 140° C. to 220° C. Drying may be effected at atmospheric pressure or at reduced pressure. During drying, a condensation of free Si—OH groups also takes place which, according to kinetics measurements, takes place preferably above 150° C., more advantageously above 180° C., and ideally above 200° C. While particles that have been dried at 100° C. for a long time are dry, they do have a high Si—OH content. At 150° C. the Si—OH content is markedly reduced but not yet fully removed, and at 200° C. Si—OH groups are again significantly reduced. A reduced Si—OH content results in advantages in the spreading behavior and in the fluidization of the particles.

The particles are dried for preferably 0.5 to 100 h, more preferably 0.5 to 24 h, and in particular 1 to 14 h.

A particularly high freedom from agglomerization of the polysilsesquioxane particles may be achieved by a subsequent milling.

In a particular embodiment, a dry, free-flowing powder may be produced in the spray dryer from the mixture obtained after the fourth step or from the dispersion obtained by isolating, washing and redispersing the mixture obtained from the fourth step. Depending on the alcohol content of the mixture the drying gas employed is air or inert gas, for example nitrogen, argon, helium, lean air comprising not more than 2% oxygen.

The spray drying may be performed in any desired apparatuses that are suitable for the spray drying of liquids and are already well known.

In a particular embodiment the spray-dried polysilsesquioxane particles are subjected to post-drying, for example in a paddle dryer, fluidized bed dryer, tray dryer, jet dryer or drum dryer.

The polysilsesquioxane particles preferably exhibit a spherical shape upon examination in an electron microscope. The spherical polysilsesquioxane particles preferably exhibit an average sphericity y of at least 0.6, in particular at least 0.7. The spherical polysilsesquioxane particles preferably have an average roundness x of at least 0.6, in particular at least 0.7. The roundness x and sphericity y may be determined according to DIN EN ISO 13503-2, page 37, annex B.3, in particular figure B.1.

It is preferable when all process steps are performed at the pressure of the ambient atmosphere, i.e. about 0.1 MPa (abs.), but they may also be performed at higher or lower pressures. Preference is given to pressures of at least 0.08 MPa (abs.), more preferably at least 0.09 MPa (abs.), and most preferably at most 0.2 MPa (abs.), in particular at most 0.15 MPa (abs.).

All of the abovementioned symbols in the abovementioned formulae are defined each independently of one another. The silicon atom is tetravalent in all formulae.

In the examples which follow, unless otherwise stated, in each case all amounts and percentages are based on weight, all pressures are 0.10 MPa (abs.) and all temperatures are 20° C.

Volume-Weighted Particle Size Distribution $D_{50}$

Determination of the volume-weighted particle size distribution is by means of static laser diffraction with the Sympatec HELOS instrument fitted with a RODOS dry disperser with 2 bar of compressed air as the dispersion medium according to ISO 13320. The $d_{50}$ indicates the median particle size.

The microscopic examinations were performed with a Zeiss SUPRA 55 VP scanning electron microscope. Prior to examination the samples were sputtered with gold to prevent charging phenomena using a Safematic CCU-010 sputter coater.

The spherical polysilsesquioxane particles of examples 1 and 2 have an average sphericity y of 0.8 and an average roundness x of 0.85 according to DIN EN ISO 13503-2, page 37, annex B.3, figure B.1.

Determination of the Chlorine Content:

Chlorine determination was carried out in a TOX—2100H by combustion of the sample at 800° C. at an inlet temperature of 800° C. and an outlet temperature of 900° C. and subsequent chlorine determination by coulometric titration.

To this end about 10-50 mg of the sample were weighed into a quartz boat with an accuracy of 0.1 mg. Combustion of the sample was carried out initially in an argon stream and subsequently in an oxygen stream. The gases are passed into a measurement cell filled with electrolyte solution. The chloride formed during combustion is then subjected to automatic coulometric titration therein.

The electrolyte solution is produced as follows: Dissolve 0.8 g of gelatine in 100 mL of DM water (warming if necessary), add 1.35 g of sodium acetate and dissolve. Initially charge 850 mL of glacial acetic acid in a 1 L measuring cylinder, add the 100 mL gelatine-sodium acetate solution and make up to 1 L with DM water. Then add 1 mL of HCl (c=0.01 mol/L).

Measurement of pH:

An electric pH meter having a glass electrode is immersed in the reactive mixture.

EXAMPLES

General Procedure 1: Production of Polymethylsilsesquioxane Particles 32 kg of demineralized (DM) water having a conductivity of 0.1 µS/cm are initially charged into an enameled 50 liter stirred tank with jacket cooling and temperature-controlled to 20° C. The mixture is stirred at 150 rpm. The pH is adjusted to pH 4.40 by addition of 0.1 molar hydrochloric acid. 7.0 kg of methyltrimethoxysilane are added over 1 h while the temperature is held at 20° C. Once metering has ended the mixture is stirred for 30 minutes at 20° C. (step 1)

The pH is optionally corrected (step 2).

Once the correction has ended the mixture is stirred for a further 30 minutes at 20° C. 363 g of 0.5 molar methanolic KOH solution are added over 1 min at 20° C. and the mixture is mixed to homogeneity for altogether 3 min (step 3). The stirrer is then switched off. After 21 h (step 4) the precipitated particles are filtered off, washed with DM water and dried at 150° C. for 18 h.

Example 1

Polymethylsilsesquioxane particles were produced according to general procedure 1.

Overview of the Different Methyltrimethoxysilane Batches

TABLE 1

| Batch | A | B | C | D | E |
|---|---|---|---|---|---|
| "Cl" content (ppm) | 100 | 180 | 380 | 510 | 520 |
| pH of reaction solution after step 1 | 3.2 | 3.1 | 3.0 | 2.8 | 2.6 |

After step 1 the pH was corrected to 2.8. In the case of batch "D" no correction was necessary since the pH after step 1 was already 2.8. After pH correction a uniform median particle size was achieved independently of the chlorine content of the batch employed. The average of the median particle size over all batches employed in example 1 was 4.9 μm at a distribution of less than ±5%.

TABLE 2

| Batch | A | B | C | D | E |
|---|---|---|---|---|---|
| pH of reaction solution after correction | 2.8 | 2.8 | 2.8 | n/a | 2.8 |
| Median particle size d50 (μm) | 5.1 | 5.0 | 4.8 | 5.0 | 4.7 |

Example 2

Polymethylsilsesquioxane particles were produced according to general procedure 1. After step 1 the pH of batch "D" was corrected to 3.2. In the case of batch "A" no correction was necessary since the pH after step 1 was already 3.2. After pH correction a uniform median particle size was achieved independently of the chlorine content of the batch employed. The average of the median particle size over all batches employed in example 2 was approx. 4.2 μm at a distribution of less than ±5%.

TABLE 3

| Batch | A | D |
|---|---|---|
| pH of reaction solution after correction | n/a | 3.2 |
| Median particle size d50 (μm) | 4.1 | 4.3 |

Comparative Example V1

Polymethylsilsesquioxane particles were produced according to general procedure 1. After step 1 the pH was not corrected.

Without pH correction the pH after step 1 and thus also the median particle size of the particles formed varied depending on the chlorine content of the employed batch. The average of the median particle size over all batches employed in noninventive comparative example V1 was approx. 4.55 μm at a distribution of ±10%.

TABLE 4

| Batch | A | D |
|---|---|---|
| pH of reaction solution after step 1 (without correction) | 3.2 | 2.8 |
| Median particle size d50 (μm) | 4.1 | 5.0 |

Comparative Example V2

Polymethylsilsesquioxane particles were produced according to general procedure 1. After step 1 the pH in the two comparative tests in comparative example V2 was adjusted in opposite directions so that the pH values diverged from one another to a relatively large extent. The median particle size of the particles formed diverged from one another even more markedly than in comparative example V1. The average of the median particle size over all batches employed in noninventive comparative example V2 was approx. 4.85 μm at a distribution of ±20%.

TABLE 5

| Batch | A* | E** |
|---|---|---|
| pH of reaction solution after step 1 with adjustment in opposite directions | 3.5 | 2.5 |
| Median particle size d50 (μm) | 3.9 | 5.8 |

A*: To simulate a batch having a very low content of chlorine (corresponding to a high pH according to step 1) the pH after step 1 was increased by addition of an amount of methanolic KOH.
E**: To simulate a batch having a very high content of chlorine (corresponding to a low pH after step 1) the pH after step 1 was by addition of an amount of aqueous HCl.

The invention claimed is:

1. A process for improving batch to batch reproducibility in a process for producing spherical polysilsesquioxane particles, where a trialkoxysilane raw material contains differing amounts of chlorine compounds in different batches, the process comprising: in a first step, reacting trialkoxysilane T which contains trialkoxysilanes of formula (I)

$$RSi(OR^1)_3 \qquad (I),$$

in which
R represents a hydrocarbon radical having 1 to 16 carbon atoms whose carbon chain may be interrupted by nonadjacent groups —O—,
$R^1$ represents a $C_1$- to $C_4$-alkyl radical,
and which contains chlorine compounds,
by mixing the trialkoxysilane T with acidified water having a pH of at most 6 to afford a hydrolyzate,
in a second step the hydrolyzate is mixed with a solution of a base in water or $C_1$-$C_4$ alkanol,
and in a third step the mixture is stored for at least 2 h before isolating polysilsesquioxane particles,
wherein following the first step, the pH of a hydrolysate produced in the first step is measured and compared with a selected value, and if different from the selected value, the pH of the hydrolysate is adjusted to reduce the difference between the pH of the hydrolysate and the selected value.

2. The process of claim 1, wherein each R independently represents an ethyl radical or a methyl radical.

3. The process of claim 1, wherein each $R^1$ independently represents an ethyl radical or methyl radical.

4. The process of claim 1, wherein in the first step, the reaction to afford the hydrolyzate is carried out at a pH of 4.5 to 2.

5. The process of claim 1, wherein the temperature of the reaction in the first step is 0° C. to 60° C.

6. The process of claim 1, wherein in the first step, per 100 parts by weight of water 5 to 43 parts by weight of trialkoxysilane are added.

7. The process of claim 1, wherein pH difference is adjusted to be within ±0.5 from the selected value.

8. The process of claim 1, wherein, in the second step, a solution of alkali metal hydroxide in water or in an alkanol having 1 to 3 carbon atoms is employed to adjust the pH.

9. The process of claim 1, wherein in the second step, sufficient solution of alkali metal hydroxide is added to ensure that a pH in the range of 6.5 to 9.5 is achieved immediately after addition of alkali metal hydroxide.

10. The process of claim 1, wherein the temperature of the addition of alkali metal hydroxide in the second step is in the range of 10° C. to 40° C.

11. The process of claim 1, wherein the particles are isolated by filtration or centrifugation after the third step.

12. A process for producing spherical polysilsesquioxane particles in a reproducible manner, the process comprising:

in a first step, reacting trialkoxysilane T which contains trialkoxysilanes of formula (I)

$$RSi(OR^1)_3 \qquad (I),$$

in which

R represents a hydrocarbon radical having 1 to 16 carbon atoms whose carbon chain may be interrupted by nonadjacent groups —O—, $R^1$ represents a $C_1$- to $C_4$-alkyl radical, and which contains chlorine compounds, by mixing the trialkoxysilane T with acidified water having a pH of at most 6 to afford a hydrolyzate, in a second step, measuring the pH of the hydrolysate, comparing the pH of the hydrolysate to a selected pH, and when different from the selected pH, adjusting the hydrolysate pH to minimize the difference between the hydrolysate pH and the selected pH to within ±0.5 pH units of the selected pH, in a third step the hydrolyzate is mixed with a solution of a base in water or $C_1$-$C_4$ alkanol, and in a fourth step, storing the mixture for at least 2 h before the polysilsesquioxane particles are isolated.

13. The process of claim 12, wherein the hydrolysate pH is adjusted to within ±0.3 pH units of the selected pH.

14. The process of claim 12, wherein the hydrolysate pH is adjusted to within ±0.1 pH units of the selected pH.

15. The process of claim 12, wherein two or more batches are produced, and the pH of the hydrolysate must be adjusted in at least one of the batches.

* * * * *